Feb. 19, 1957  F. KAERGER  2,781,674
INFINITELY VARIABLE DRIVING MECHANISM
Filed Sept. 25, 1953

INVENTOR:
FRITZ KAERGER
BY:

United States Patent Office 2,781,674
Patented Feb. 19, 1957

2,781,674

INFINITELY VARIABLE DRIVING MECHANISM

Fritz Kaerger, Bad Homburg vor der Hohe, Germany, assignor to Firma Patentverwertung W. Reimers G. m. b. H., Bad Homburg vor der Hohe, Germany Application September 25, 1953, Serial No. 382,409

Claims priority, application Germany September 29, 1952

14 Claims. (Cl. 74—665)

The present invention relates to a driving mechanism with continuous speed control for regulating the speed of rotation of a driving shaft so as to be infinitely variable within a large speed range.

Infinitely variable speed transmissions have already been known, in which continuously variable gears are used in connection with gear transmissions and clutches for raising the variable speed range of the speed transmission to a higher power, for example, to the second or third power, in accordance with the number of stages of a stage selection gear unit or the size of the gear ratios in each stage. Although such driving mechanisms permit the control of a very large speed range, they have the disadvantage that in shifting from one to the other stage of the stage selection gear unit they require that the power output be interrupted.

Although, in order to overcome this disadvantage, certain gear designs have already been suggested in which the shafts to be controlled are engaged in synchronism, these designs have the disadvantage of requiring a large number of gears and clutches so as to obtain a continuous power transitition from one stage to the other.

For a continuous speed regulation it is also known to use for the driving power, in place of an infinitely variable speed transmission, a direct current electric motor which is controlled within a large speed range by grid controlled electron tubes or gas discharge tubes. A constant power output can be obtained, however, with such electrically controlled drive only within a speed range of 1:3. Although such speed range may be enlarged to any desired extent by additional stage selection gear units, this again results in the disadvantage that while shifting from one stage to the other, it is necessary to interrupt the power output.

According to the present invention, a driving mechanism is used in which an electric variable speed motor is connected with a stage selection gear unit, and it is the object of the invention to design such a driving unit which requires only few gear elements, avoids the interruption of power when shifting the stage selection gear from one speed range to the other, and thus permits a continuous power output within a large speed range.

A feature of the invention for attaining this object consists in designing the driving mechanism so that the stage selection gear unit is connected with two electric motors which can be alternately engaged so as to furnish the driving power, and the speed of at least one of which may be continuously variable.

The electric variable speed motor according to the invention preferably has a continuous speed control range of constant power output equal to that of a speed control stage of the stage selection gear unit.

Another feature of the invention consists in means for reducing the speed of the variable speed motor in the operative position in which the second electric motor is engaged to furnish the driving power.

According to one preferred embodiment of the invention, the second electric motor has a constant speed, and can be engaged temporarily to furnish the driving power while the stage selection gear is being shifted, and while the speed of the disengaged variable speed motor is being reduced. While the driving power is being furnished by the variable speed motor, the constant speed motor may then run along idle.

Another feature of the invention is to synchronize the nominal or rated speed of the constant speed motor with the speed of the engaged gear shaft at the lowest speed of the variable speed motor.

It is still a further object of the invention to substitute a second electric variable speed motor for the constant speed motor previously mentioned. An inventive feature of such driving mechanism thus consists in the provision of two electric motors, the speed of which is continuously variable, and which can be alternately engaged in adjacent speed control stages of the stage selection gear to furnish the driving power.

Another feature of the invention is that the stage selection gear which is engaged with the two electric motors may, in every embodiment of the invention, be designed so as to raise the speed control range of the variable speed motor, or motors, to the second or third power.

The stage selection gear unit according to the invention preferably consists of speed-increasing or reducing gear pairs which by means of clutches may be selectively engaged with a main shaft or auxiliary shaft, or with the driven or the shaft of the variable speed motor, or motors, or the constant speed motor. The gear ratios of the respective gear pairs then determine the speed selection stages of the gear unit and they are dimensioned in accordance with the continuous speed range of the variable speed motor or motors.

Further objects, features, and advantages of the present invention will be apparent from the following detail description thereof and the appended drawings, in which—

Fig. 3 shows a driving unit with continuous speed regulation using two variable speed motors for raising the speed range to the second power; while

Figure 1:
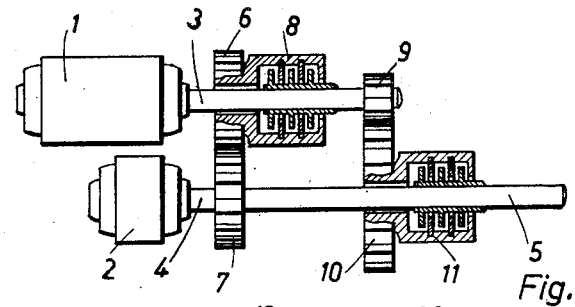
Fig. 1 shows a driving unit with continuous speed regulation using a variable speed motor and a constant speed squirrel cage induction motor for raising the speed range of the variable speed motor to the second power.

As shown in Fig. 1, the variable speed motor 1 carries on a shaft 3 a small gear 9. The shaft 3 may also be engaged by a clutch 8 with another gear 6 which, in turn, engages a gear 7 which is connected, on the one hand with the driven shaft 5 and, on the other hand, through an auxiliary shaft 4 with the constant speed motor 2. Further, a clutch 11 permits the engagement of a larger gear 10 with the driven shaft 5, and the gear 10 is in constant engagement with the small gear 9 on the shaft 3 of the variable speed motor 1.

The variable speed motor 1 when in the highest speed position drives the driven shaft 5 through the clutch 8 and the pair of gears 6 and 7. The constant speed motor 2 which is connected with the driven shaft 5 through the auxiliary shaft 4 is merely carried along idle. In so doing, the clutch 8 is engaged and the clutch 11 disengaged. The gear ratio of the gears 6 and 7 is such that at the lowest speed of the variable speed motor 1, wherein it can still run at a constant power output, the constant speed motor 2 attains its rated speed. If the speed of the driven shaft 5 should then be further reduced, the motor 2 will be engaged to take over the load, for example, by switching on the net current, if the motor 2 is a squirrel cage induction motor. Now, the variable speed motor 1 may be disconnected, but the driven shaft 5 still continues to run at the formerly attained speed. The clutch 8 is then disengaged and the variable speed motor 1 regulated back to its maximum speed. If this maximum speed is attained, the elements of the clutch 11 are in synchronism since the gear ratio of the gears 9 and 10 is designed accordingly. The clutch 11 can then be engaged after the variable speed motor 1 had previously again been switched on. The variable speed motor 1 thus again takes over the driving and the motor 2 can be switched off without requiring any interruption of power at the driven shaft 5. The speed of the variable speed motor 1 can now again be reduced until the minimum drive speed is attained. The upward regulation is carried out accordingly. If, for example, the speed range of the variable speed motor 1 is 1:3, this squaring drive may be used to obtain a speed range of 1:9 with a constant power, and without an interruption of power.

Figure 2:
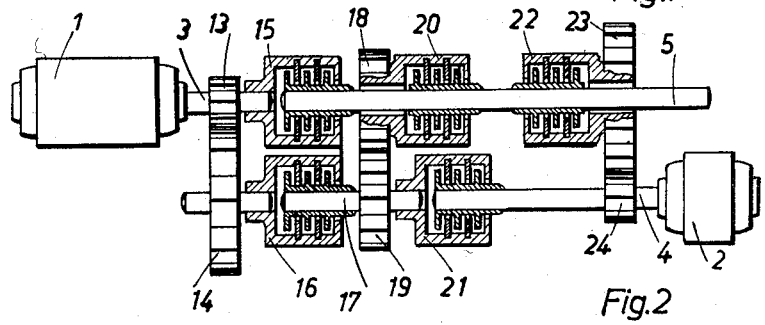
Fig. 2 shows the same driving unit with a more elaborate gear system for raising the speed range of the variable speed motor to the third power.

In the embodiment of the invention shown in Fig. 2 the variable speed motor 1 is connected by a shaft 3 with the small gear 13 and a clutch 15 which, in turn, is connected with the driven shaft 5. The driven shaft 5 may be selectively engaged by a clutch 20 with a gear 18 or through a further clutch 22 with a larger gear 23. The constant speed motor 2 is connected by a shaft 4 with a small gear 24 which is in constant engagement with the larger gear 13, as well as with a clutch 21, by which a gear 19 which is in constant engagement with the gear 18 may be connected to the shaft 4. The gear 19 on a shaft 17 may be engaged by a clutch 16 with a larger gear 14 which is in constant engagement with the small gear 13.

In the control stage I of this driving unit, that is, within the range of the highest speed of the driven shaft 5, the driving force of the variable speed motor 1 passes through the shaft 3 and the engaged clutch 15 directly to the driven shaft 5. Aside from the clutch 15 also the clutch 21 is engaged, and the electric motor 2 runs at its rated speed. The clutches 16, 20, and 22 are disengaged so that the motor 2 exerts no influence upon the driven shaft 5 and the shaft 3. If the variable speed motor 1 attains its lowest speed for constant power output, the elements of clutch 20 are in synchronism.

When in this condition, the transition to the control stage II begins. The clutch 20 will be engaged and simultaneously the clutch 15 opened. The constant speed motor 2 continues to drive the driven shaft 5 at the same speed through shaft 4, clutch 21, the gear pair 18 and 19, and the clutch 20, while the variable speed motor 1 is regulated back until it has again attained its maximum speed. Hereby the elements of clutch 16 come into synchronism because the ratio of the gear pair 13 and 14 is made equal to the control range of the variable speed motor 1. Now, the clutch 16 is engaged and the clutch 21 disengaged so that the variable speed motor 1 again takes over the driving without interruption of power. The drive in this control position goes from the variable speed motor 1 through shaft 3, gears 13 and 14, clutch 16, shaft 17, gears 18 and 19, and clutch 20 to the driven shaft 5. The speed of the driven shaft 5 may now be further continuously reduced by regulating the motor 1 downwardly. As soon as the variable speed motor 1 has attained its lowest speed of constant power output, synchronism is obtained between the elements of the clutch 22 since the ratio of the gear pair 23 and 24 is provided accordingly.

Now, the control stage III may be initiated by engaging the clutch 22 and disengaging the clutch 20. The motor 2 will now take over the driving of the shaft 5, and the variable speed motor 1 can again be regulated back to the highest speed. In this speed position the elements of the clutch 21 are in synchronism, so that this clutch can be engaged. The driving power now proceeds from the variable speed motor 1 through the shaft 3, gears 13 and 14, clutch 16, shaft 17, clutch 21, gears 23 and 24, and clutch 22 to the driven shaft 5. The variable speed motor 1 is now again regulated downwardly, and at its lowest speed of constant power output the lowest speed of the driven shaft 5 is attained.

Figure 3:
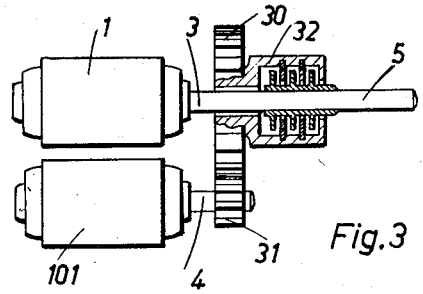

In the embodiment of the invention shown in Fig. 3, a variable speed motor 1 is connected through its shaft 3 with the driven shaft 5, and a second variable speed motor 101 is connected through its shaft 4 with a small gear 31 which is in constant engagement with a large gear 30, which, in turn, may be engaged by a clutch 32 with the driving shaft 5.

In the control stage I, i. e. the stage of higher speeds, the variable speed motor 1 drives the driven shaft 5 directly. While the variable speed motor 1 runs downwardly through its speed range of constant power output, the variable speed motor 101 runs at its highest speed. The gear ratio of the pair of gears 30 and 31 is so dimensioned that at the lowest speed which the variable speed motor 1 is able to supply at a constant power output, synchronism is obtained between the elements of the clutch 32. Now, if the speed of the driven shaft 5 should be further reduced, the control stage II is initiated by engaging the clutch 32 and regulating the motor 101, which previously had been running idle but at maximum speed, to take over the driving, and regulating the variable speed motor 1 to run idle. The motor 101 then transmits the driving force through shaft 4, the pair of gears 30 and 31, and the clutch 32 to the driven shaft 5. When regulating the motor 101 downwardly, also motor 1 reduces its speed since it remains connected to the driven shaft 5. With this mechanism it is thus possible by means of only one pair of gears and one clutch and two variable speed motors to run without interruption of power and at a constant power output through a speed range of the driven shaft which corresponds to the square of the speed range of one variable speed motor.

Figure 4:
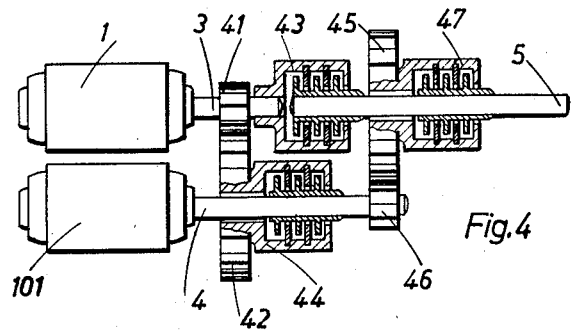
Fig. 4 shows the same driving unit as shown in Fig. 3 with a more elaborate gear system for raising the speed range to the third power.

In the embodiment of the invention shown in Fig. 4, a variable speed motor 1 is connected by a shaft 3 with a small gear 41 as well as with a clutch 43 which, in turn, is connected with the driven shaft 5 which may be engaged by a clutch 47 with a larger gear 45. A second variable speed motor 101 is connected through a shaft 4 with a small gear 46 which is in constant engagement with the gear 45. The shaft 4 may be engaged by a clutch 44 with a larger gear 42 which is in constant engagement with the small gear 41 of the first motor shaft 3.

In control stage I, the clutch 41 is engaged and the power is transmitted from the variable speed motor 1 directly to the driven shaft 5. At this time, the clutches 44 and 47 are disengaged. When the variable speed motor 1 is regulated downwardly, the idling motor 101 carries out the reverse speed change, i. e. its speed is increased. After attaining the lowest speed of the variable speed motor 1, synchronism is obtained between the shafts at the clutch 47. Thus begins the control stage II by the engagement of the clutch 47 and the simultaneous disengagement of the clutch 43. The variable speed motor 101 now takes over power transmission through shaft 4, the pair of gears 45 and 46, and clutch 47 to the driven shaft 5. Although the variable speed motor 1 is disengaged, it carries out the speed change in reverse direction. When the variable speed motor 101 arrives at its lowest speed of constant power output, synchronism is obtained between the elements of the clutch 44. Herewith starts the transition to control stage III by engaging the clutch 44 and running through the speed range with the variable speed motor 1. The power is then transmitted from the variable speed motor 1 through shaft 3, the pair of gears 41 and 42, clutch 44, the pair of gears 45 and 46, and the clutch 47 to the driven shaft 5. The clutch 43 is disengaged and the variable speed motor 101 runs along idle. Through this mechanism it is possible by means of only two pairs of gears, three clutches, and two variable speed motors to raise the speed range of a motor to the third power.

While in the foregoing description I have set forth in detail what I regard as the preferred embodiment of my invention, it is to be understood that numerous changes may be made without departing from the scope of the invention as defined in the appended claims.

Having thus described my invention, what I claim as new is:

1. In a transmission arrangement, in combination, first variable drive means adjustable between two speed limits; second drive means adapted to rotate at at least one predtermined speed; a shaft connected to and driven by one of said drive means; transmission means including a coupling and connecting the other of said drive means with said shaft, said transmission means having a predetermined ratio so that said second drive means rotating at said predetermined speed drives said shaft at the same speed as said first drive means rotating at one of said speed limits, said coupling being in coupling position when said other drive means drives said shaft and being in a disconnected position when said one drive means drives said shaft.

2. In a transmission arrangement, in combination, first variable drive means adjustable between two speed limits; second drive means adapted to rotate at a constant predetermined speed; a shaft connected to and driven by one of said drive means; transmission means including a coupling and connecting the other of said drive means with said shaft, said transmission means having a predetermined ratio so that said second drive means rotating at said predetermined speed drives said shaft at the same speed as said first drive means rotating at one of said speed limits, said coupling being in coupling position when said other drive means drives said shaft and being in a disconnected position when said one drive means drives said shaft, said one of said drive means comprising a motor connected to said shaft for rotation, and said other of said drive means comprising a motor and another transmission means including another coupling, said other transmission means being connected to said shaft so that the speed of said first variable drive means can be adjusted to the other speed limit while said couplings are disconnected.

3. In a transmission arrangement, in combination, a first variable drive means including a motor adjustable between two speed limits; a second variable drive means including a motor adjustable between a predetermined speed and another speed; a shaft connected to and driven by said first drive means; transmission means including a coupling and connecting said second drive means with said shaft, said transmission means having a predetermined ratio so that said motor of said second drive means rotating at said predetermined speed drives said shaft at the same speed as said motor of said first drive means rotating at one of said speed limits, said coupling being in coupling position when said second drive means drives said shaft and being in a disconnected position when said first drive means drives said shaft.

4. In a transmission arrangement, in combination, first variable drive means adjustable between two speed limits; second drive means adapted to rotate at at least one predetermined speed; a shaft connected to and driven by one of said drive means; transmission means including a coupling and a gear train connecting the other of said drive means with said shaft, said gear train having a predetermined ratio so that said second drive means rotating at said predetermined speed drives said shaft at the same speed as said first drive means rotating at one of said speed limits, said coupling being in coupling position when said other drive means drives said shaft and being in a disconnected position when said one drive means drives said shaft.

5. In a transmission arrangement, in combination, first variable drive means adjustable between two speed limits; second drive means adapted to rotate at a constant predetermined speed; a shaft connected to and driven by one of said drive means; transmission means including a coupling and a gear train connecting the other of said drive means with said shaft, said gear train having a predetermined ratio so that said second drive means rotating at said predetermined speed drives said shaft at the same speed as said first drive means rotating at one of said speed limits, said coupling being in coupling position when said other drive means drives said shaft and being in a disconnected position when said one drive means drives said shaft, said one of said drive means comprising a motor connected to said shaft for rotation, and said other of said drive means comprising a motor and another transmission means including another coupling and another gear train, said other gear train being connected to said shaft so that the speed of said first variable drive means can be adjusted to the other speed limit while said couplings are disconnected.

6. In a transmission arrangement, in combination, a first variable drive means including a motor adjustable between two speed limits; a second variable drive means including a motor adjustable between a predetermined speed and another speed; a shaft connected to and driven by said first drive means; transmission means including a coupling and a gear train connecting said second drive means with said shaft, said gear train having a predetermined ratio so that said motor of said second drive means rotating at said predetermined speed drives said shaft at the same speed as said motor of said first drive means rotating at one of said speed limits, said coupling being in coupling position when said second drive means drives said shaft and being in a disconnected position when said first drive means drives said shaft.

7. In a transmission arrangement, in combination, a shaft; first variable drive means comprising a motor adjustable between two speed limits and a transmission means including a coupling, said transmission means being connected to said shaft; second drive means comprising a motor adapted to rotate at a constant predetermined speed and being connected to said shaft; and a transmission means including a coupling and connecting said first drive means with said shaft, said last mentioned transmission means having a predetermined ratio so that said motor of said first drive means rotating at one of said speed limits drives said shaft at the same speed as said motor of said second drive means rotating at said predetermined speed, said last-mentioned coupling being in coupling position when said first drive means drives said shaft, said couplings being in disconnected position when said second drive means drives said shaft.

8. A transmission arrangement a claimed in claim 7 wherein said one speed limit is the lower speed limit of said motor of said first drive means.

9. In a transmission arrangement, in combination, a first variable motor adjustable between two speed limits; a second motor adpated to rotate at a constant predetermined speed; an output shaft; a first shaft driven by said first motor; a first coupling connecting said first shaft with said output shaft; a third shaft; a first transmission connecting said first shaft with said third shaft; a fourth shaft; a second coupling connecting said third shaft with said fourth shaft; a second transmission connected to said fourth shaft; a third coupling connecting said second transmission with said output shaft; a fifth shaft connected to said second motor; a fourth coupling connecting said fourth shaft with said fifth shaft; a third transmission connected to said fifth shaft; and a fifth coupling connecting said third transmission with said output shaft, said transmissions having predetermined ratios so that said ouput shaft can be rotated by said second motor running at said constant predetermined speed at the same speeds obtained when said first motor rotates at said speed limits thereof.

10. In a transmission arrangement, in combination, a first variable motor adjustable between two speed limits; a second motor adapted to rotate at a constant predetermined speed; an output shaft; a first shaft driven by said first motor; a first coupling connecting said first shaft with said output shaft; a third shaft; a first gear train connecting said first shaft with said third shaft; a fourth shaft; a second coupling connecting said third shaft with said fourth shaft; a second gear train connected to said fourth shaft; a third coupling connecting said second gear train with said output shaft; a fifth shaft connected to said second motor; a fourth coupling connecting said fourth shaft with said fifth shaft; a third gear train connected to said fifth shaft; and a fifth coupling connecting said third gear train with said output shaft, said gear trains having predetermined ratios so that said output shaft can be rotated by said second motor running at said constant predetermined speed at the same speeds obtained when said first motor rotates at said speed limits thereof.

11. In a transmission arrangement, in combination, a first variable motor adjustable between two speed limits; a second variable motor adjustable between two speed limits; a shaft connected to and driven by said first motor; transmission means including a coupling and connecting said second motor with said shaft, said transmission means having a predetermined ratio so that said second motor rotating at one of said speed limits thereof drives said shaft at the same speed as said first motor rotating at one of said speed limits thereof, said coupling being in coupling position when said second motor drives said shaft and being in a disconnected position when said first motor drives said shaft.

12. In a transmission arrangement, in combination, a first variable motor adjustable between two speed limits; a second variable motor adjustable between two speed limits; a shaft connected to and driven by said first motor; transmission means including a coupling and a gear train connecting said second motor with said shaft, said gear train having a predetermined ratio so that said second motor rotating at one of said speed limits thereof drives said shaft at the same speed as said first motor rotating at one of said speed limits thereof, said coupling being in coupling position when said second motor drives said shaft and being in a disconnected position when said first motor drives said shaft.

13. In a transmission arrangement, in combination, a first variable motor adjustable between two speed limits; a second variable motor adjustable between two speed limits; an output shaft; a first shaft driven by said first motor; a first coupling connecting said first shaft with said output shaft; a second shaft connected to said second motor; a first transmission means including a coupling and a transmission connecting said first shaft with said second shaft; and a second transmission means including a coupling and a transmission connecting said second shaft with said output shaft, said transmissions having predetermined ratios so that said second motor rotating at one of said speed limits thereof drives said output shaft at the same speed as said first motor rotating at one of the said speed limits thereof.

14. In a transmission arrangement, in combination, a first variable motor adjustable between two speed limits; a second variable motor adjustable between two speed limits; an output shaft; a first shaft driven by said first motor; a first coupling connecting said first shaft with said output shaft; a second shaft connected to said second motor; a first transmission means including a coupling and a gear train connecting said first shaft with said second shaft; and a second transmission means including a coupling and a gear train connecting said second shaft with said output shaft, said gear trains having predetermined ratios so that said second motor rotating at one of said speed limits thereof drives said output shaft at the same speed as said first motor rotating at one of the said speed limits thereof.

References Cited in the file of this patent
UNITED STATES PATENTS
2,578,015    Reinhard _____ Dec. 11, 1951